(12) United States Patent
Rider (10) Patent No.: US 7,743,334 B2
(45) Date of Patent: Jun. 22, 2010

(54) DYNAMICALLY CONFIGURING A WEB PAGE

(75) Inventor: Steven D. Rider, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/366,723

(22) Filed: Mar. 2, 2006

(65) Prior Publication Data

US 2007/0208991 A1    Sep. 6, 2007

(51) Int. Cl.
G06F 3/00    (2006.01)
(52) U.S. Cl. .................. 715/762; 715/760; 715/764; 715/765
(58) Field of Classification Search .................. 715/705, 715/760, 762, 764, 765
See application file for complete search history.

(56) References Cited

U.S. PATENT DOCUMENTS

| | | | | |
|---|---|---|---|---|
| 6,209,007 B1 * | 3/2001 | Kelley et al. | ................. | 715/234 |
| 6,330,566 B1 * | 12/2001 | Durham | ................... | 707/104.1 |
| 6,728,769 B1 * | 4/2004 | Hoffmann | ................... | 709/225 |
| 6,823,359 B1 * | 11/2004 | Heidingsfeld et al. | ....... | 709/203 |
| 6,912,715 B2 * | 6/2005 | Gao et al. | ................... | 719/311 |
| 6,950,980 B1 * | 9/2005 | Malcolm | ................... | 715/207 |
| 7,234,107 B1 * | 6/2007 | Aoki et al. | ................... | 715/207 |
| 7,392,293 B2 * | 6/2008 | Leonik | ................... | 709/217 |
| 2002/0049708 A1 * | 4/2002 | Moneymaker et al. | ......... | 707/1 |
| 2003/0112274 A1 * | 6/2003 | Gao et al. | ................... | 345/760 |
| 2003/0149707 A1 * | 8/2003 | Helmbrecht et al. | ...... | 707/104.1 |
| 2003/0177175 A1 * | 9/2003 | Worley et al. | ............... | 709/203 |
| 2004/0103040 A1 * | 5/2004 | Ronaghi et al. | ............... | 705/26 |
| 2005/0114345 A1 * | 5/2005 | Wesinger et al. | .............. | 707/10 |
| 2006/0149746 A1 * | 7/2006 | Bansod et al. | ................ | 707/10 |
| 2007/0074111 A1 * | 3/2007 | Firshein et al. | ............. | 715/530 |
| 2007/0136417 A1 * | 6/2007 | Kreiner et al. | .............. | 709/203 |
| 2008/0005657 A1 * | 1/2008 | Sneh | ....................... | 715/501.1 |

OTHER PUBLICATIONS

"my.yahoo.com", published Jan. 2005, pp. web archive, 1, and 2.*

* cited by examiner

Primary Examiner—William L Bashore
Assistant Examiner—Gregory A DiStefano
(74) Attorney, Agent, or Firm—Shook, Hardy & Bacon, LLP.

(57) ABSTRACT

An approach to dynamically adding and removing items from a web-application list module is provided. The approach includes configuring a web page without changing to another web page, and operating a configuration program in a web browser. A user may change various user elements in a web page without accessing an edit page or refreshing the web page. The changes are incorporated while the user continues to interact with the web page. The changed information is stored and may be associated to the user's computer or the user using cookies.

11 Claims, 8 Drawing Sheets

```
//----------------------------------------------------------
//
//    Class:        Gadget.Stocks
//
//    Synopsis: Specialized module class for displaying stocks
//
//----------------------------------------------------------
```

805 → frm.attachEvent("onsubmit", OnAdd);

810 → function OnAdd(ev)

815 → function AddStockCallback(response)

820 → function OnRemove(ev)

DYNAMICALLY CONFIGURING A WEB PAGE

CROSS-REFERENCE TO RELATED APPLICATIONS

Not applicable.

STATEMENT REGARDING FEDERALLY SPONSORED RESEARCH OR DEVELOPMENT

Not applicable

BACKGROUND

Web applications that display personalized data to a user such as news headlines and stock quotes typically employ multiple web pages in order to edit the preferences for each piece of content. For example, a web site that presents the latest stock quotes and weather data will typically require the user to navigate to a separate web page in order to manage the list of stock ticker entries and weather locations. This type of customization tends to be cumbersome, hard to discover, and slow. The user has to go to the web page where the edits are to occur, understand the various options that may appear, implement the changes that are desired, save the changes, and re-acquire the original web page where the changes from the edit page are to appear. Care has to be taken to prevent the user from becoming frustrated with making changes since the edit pages can be ominous with numerous messages. Furthermore, the changes should be easily apparent, within view, and not scrolled off the updated web page.

The reverse situation is just as important. Oftentimes, when the user wants to remove an item from the web page, the user has to access the edit page, make the proper selection for removal, and re-acquire the original web page to view if the item has been removed. The user can also edit without accessing another web page to remove an item. The original web page refreshes when a selection is made to remove the item. The corresponding item no longer appears on the web page.

It is beneficial to the user to have computer software operating in a web browser that allows edits without changing to an edit page or without refreshing the web page. Various steps in the update or removal process should become transparent to the user reducing the amount of time the user has to spend on customization or setting preferences.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, an approach to dynamically adding and removing items from a web-application list module. The various solutions are summarized below as follows.

A method is provided for configuring a web page without changing to another web page that includes providing for an operation of a web browser to show information in the web page. Changes are implemented to the information displayed in the web browser, from inputs, without refreshing the web page or without changing to another web page. The changes to the web page are displayed on the web page.

In another aspect, a method is provided for dynamically adding and removing elements from a web-application list module in a web server that includes providing a web page with configurable elements to be viewed by a user. An input is received to modify a subset of the configurable elements displayed in the web page. A user preference is received into an edit box with a button within an initial display of the web page to add a configurable element. The user preference is received at the initial display of the web page to remove the configurable element. A communication with another computing device is performed using XMLHTTP to obtain data in response to the user preference to add or remove the configurable element. A modified subset of the configurable elements is provided in the web page using the data. The configurable element is added to the set of configurable elements in the web page using DHTML. The configurable element is removed from the set of configurable elements using DHTML. The user preference is stored in a set of cookies at a computing device or at a server associated with a username and password such that a retrieval of the web page and the set of cookies implements the user preference in the web page to provide an updated web page. The user is allowed to interact with the updated page uninterrupted during a receipt of the user preference, a communication with the other computing device, an additional of the configurable element, and a removal of the configurable element.

In yet another aspect, a computer system is provided for operating a configuration program in a web browser that includes a computing device with the web browser. The web browser operates with a first, second, and third computer software. The first computer software obtains data to configure a web page. The second computer software adds data to the web page. The third computer software removes data from the web page. The first computer software operates with the second software or the third computer software to exchange data with other computing devices while the computing device continues to provide a user interface or information to the user.

BRIEF DESCRIPTION OF THE SEVERAL VIEWS OF THE DRAWINGS

The present invention is described in detail below with reference to the attached drawing figures, which are incorporated herein by reference, and wherein:

FIGS. 5A and 5B are exemplary screenshots of web pages operating with an implementation of an embodiment of the present invention;

DETAILED DESCRIPTION

The present invention will be better understood from the detailed description provided below and from the accompanying drawings of various embodiments of the invention, which describe, for example, an approach to dynamically adding and removing items from a web-application list module. The detailed description and drawings, however, should not be read to limit the invention to the specific embodiments. Rather, these specifics are provided for explanatory purposes that help the invention to be better understood.

Exemplary Operating Environment

Figure 1:
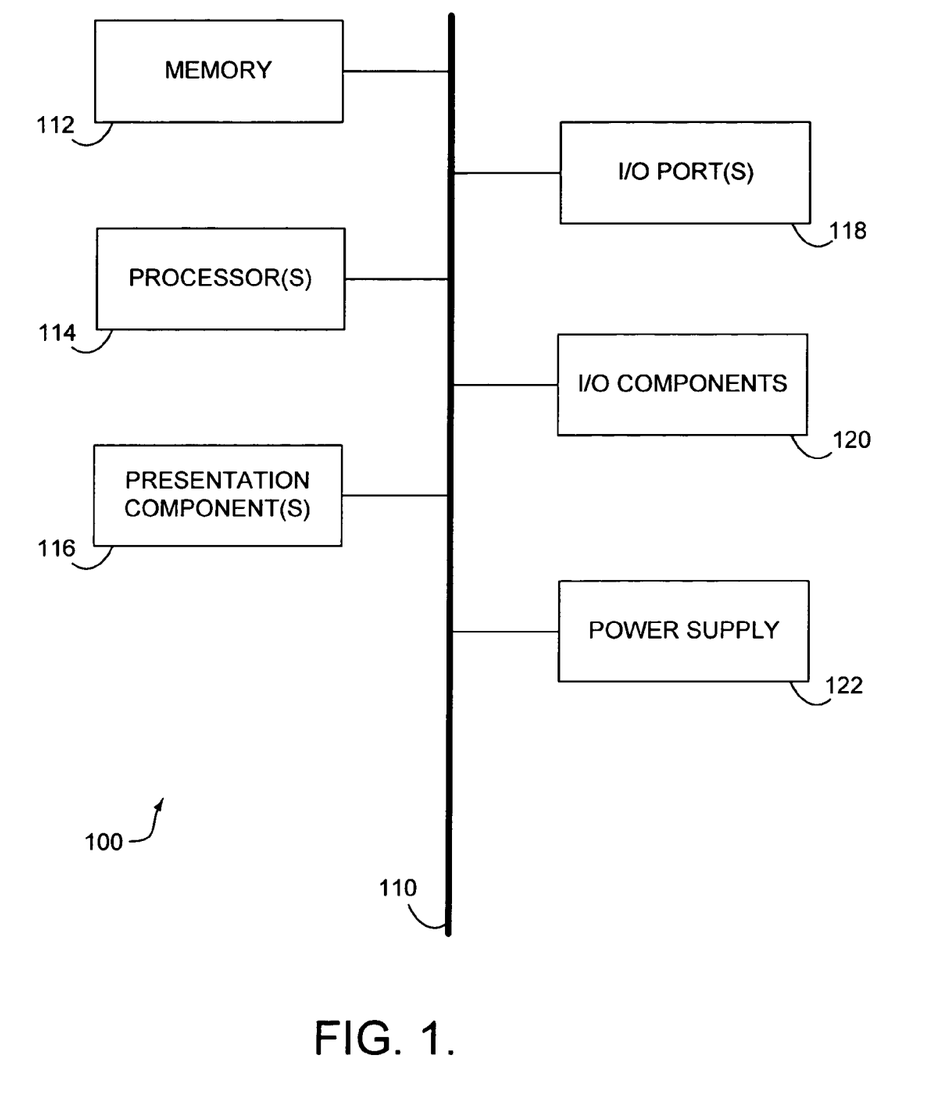
FIG. 1 is an exemplary operating environment suitable for practicing an embodiment of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing-environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

To help explain the invention without obscuring its functionality, an embodiment will now be referenced in connection with a computing network. Although the present invention can be employed in connection with a computing-network environment, it should not be construed as limited to the exemplary applications provided here for illustrative purposes.

Dynamically Adding and Removing Items From a Web Application

An embodiment of the present invention takes an approach that customization of a web page should be simple, responsive, and occur within the context of a module. This is done by allowing a new item to be added to a list using a button shown in a display of a web page directly associated with the module without requiring a navigation to an edit page. For example, to add a new stock quote to the web page, one would enter the name of the stock quote in a text field in the module shown in the display of the web page, followed by selecting an "Add" button or some other symbol. The quote is gathered from a server and dynamically added to the module without extra user interaction.

A similar process may occur in reverse. An item may be removed from the list by selecting an "X" icon or another symbol that may appear next to each item in the list. When the "X" symbol is selected, the item is dynamically removed from the list in the module causing the item to disappear from the display of the web page.

In the two cases above, the user may not even be aware that they are customizing the web page since they are not required to visit a separate edit page and not required to select a "save" button. The customization experience is seamless allowing a change to occur with little or no interaction, and having that change remembered for the particular computing device or user.

To illustrate the points further, several figures shall be discussed to provide details of implementing embodiments of the present invention.

Figure 2:
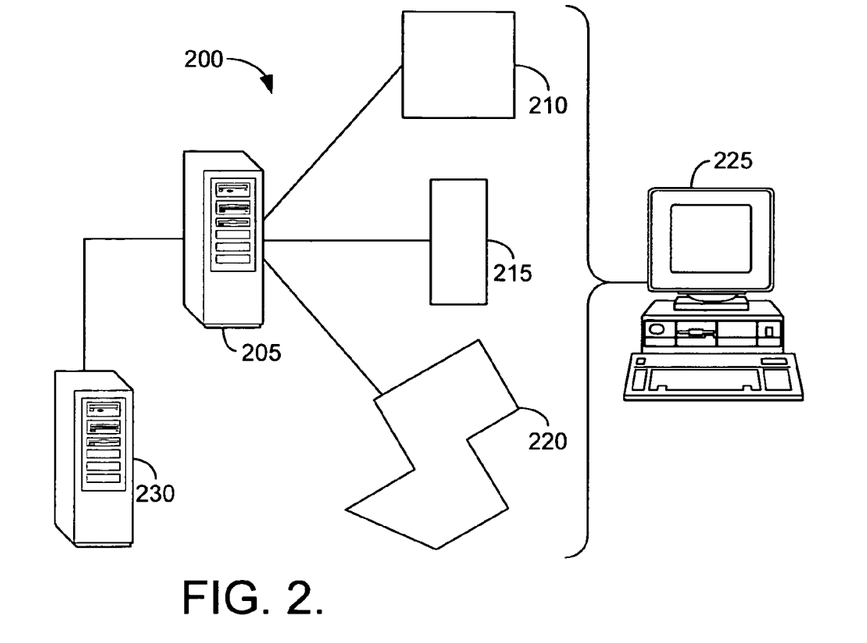
FIG. 2 is a block diagram of an exemplary web environment with a web server providing various web pages.

In FIG. 2, a block diagram of an exemplary web environment with a web server is shown in 200. Web environment 200 shows a web server 205 that provides a web page 210, an edit page 215, and an updated web page 220. Web page 210, edit page 215, and updated web page 220 may be accessed and viewed by a user at a computing device 225. Web server 205 may also be connected to a server 230. Although one device is shown, server 230 may represent more than one server that may be connected to web server 205 through various network connections.

Before implementing an embodiment of the present invention, the user at computing device 225 may access web page 210 to interact with information displayed on a screen at computing device 225. Web page 210 shows various types of information grouped into modules. For example, web page 210 may include news information, stock information, weather information, or other information presented to the user. This information may change depending on the desires of the user at computing device 225.

If the user at computing device 225 wants to change any of the information displayed on the screen for web page 210, the user has to select an "edit" button or other symbol that appears on the screen of web page 210. By selecting the "edit" button, the user is shown edit page 215. This means that web page 210 disappears and another web page, edit page 215, appears with the components to allow the user to make changes to web page 210. The user makes desired changes at computing device 225 until the user has selected the desired preferences. This selection could include choices of adding information, removing information, re-arranging the location of information, or updating existing information to name a few. Furthermore, the selection may involve retrieving information from another server such as server 230 to enable the adding, removing, re-arranging, or updating of information. As shown in FIG. 2, although the various web pages may reside at web server 205, the retrieval of information for the user at computing device 225 may involve other servers such as server 230. In some instances, edit page 215 may not reside at web server 205, but reside at server 230. When the "edit" button is selected, edit page 215 is retrieved from server 230 and shown to the user. Again, server 230 may represent more than one server but is illustrated here as one device for clarity.

Once the user selects the preferences, the user may select a "save" button to store, change, or update the desired information. Or, the user may select another item on the display at computing device 225 causing the display screen to refresh. In either case, an updated web page 220 appears with the user's preferences.

For simplicity, the process from viewing web page 210 to viewing updated web page 220 involves accessing an interim edit page 215. At a minimum, the user accesses three different web pages, the original webpage, the edit web page, and the resulting updated web page. Each web page provides information allowing user interaction. For example, the user has to select a button in web page 210 to be taken to an edit page. Then, the user has to make choices in edit page 215 to receive the desired information, modify the desired information, or change the layout of the information, such as reordering the list of weather cities. Finally, the user has to save the selection or refresh information in edit page 215 in order to receive updated web page 220. If the user desires to make additional changes, the process begins again with the user selecting an "edit" button in updated web page 220.

Figure 3:
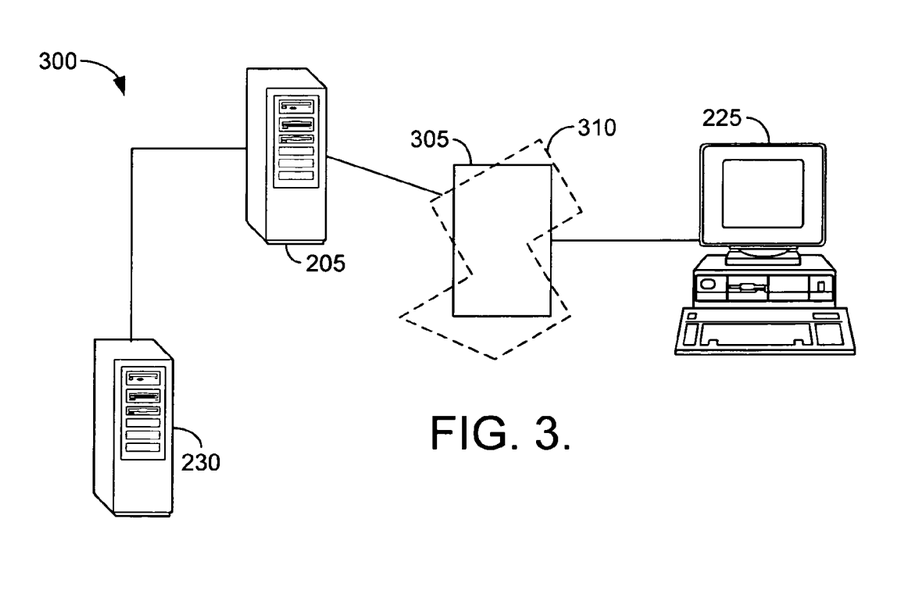
FIG. 3 is a block diagram of an exemplary web environment implementing an embodiment of the present invention.

Turning now to FIG. 3, FIG. 3 illustrates what happens when an embodiment of the present invention is implemented to the activities described in FIG. 2. In FIG. 3, web server 205 provides web page 305 to the user at computing device 225. Web page 305 may be visually the same as web page 210. However, the contents are different. In web page 305, the user desires to make changes to web page 305 and attempts to implement the changes by either adding, removing, re-arranging, or updating information in web page 305. Without changing to another web page or refreshing the web page, the information changes in the screen display in front of the user at computing device 225 resulting in an updated web page 310. The updated web page 310 is the same web page 305 with a module or information within the page changed. Updated web page 310 is not a new or refreshed web page.

As an example, if the user desires to add a stock quote to the list of stocks appearing in web page 305, the user enters the stock quote and selects an "Add" button. The stock quote automatically appears on the screen changing web page 305 into updated web page 310. However, what is not seen is that the computer software in web page 305 at web server 205 operates to retrieve information from server 230. Web page 305 operates with an enhanced web browser (not shown) with computer software that enables changes to occur at computing device 225 without the efforts described in FIG. 2. The user does not have to access an edit page, save information, nor refresh a screen or web page.

Figure 4:
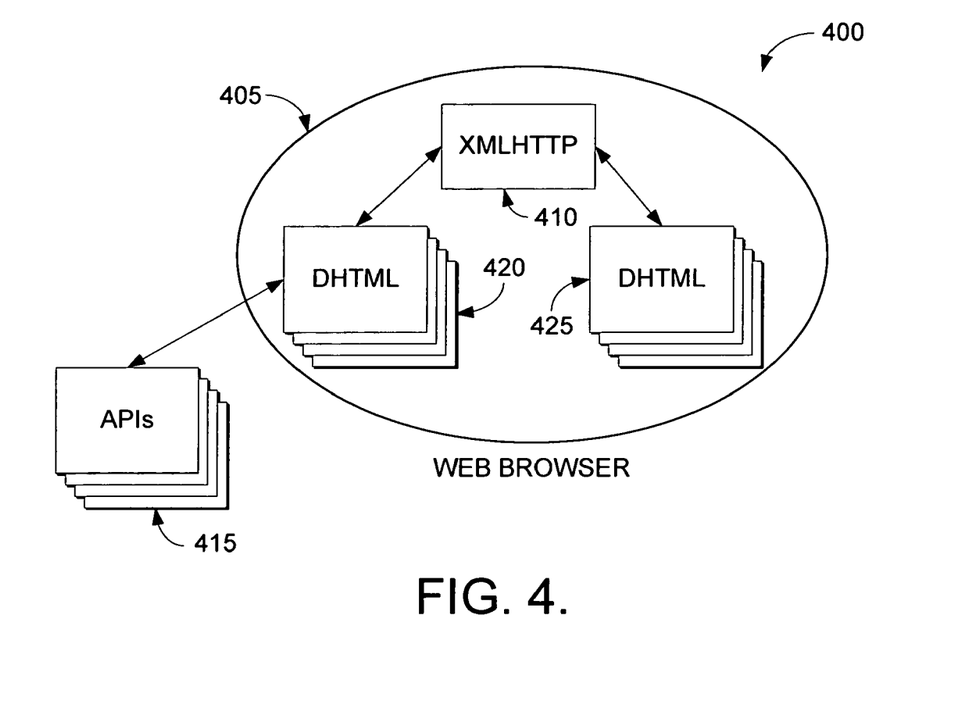
FIG. 4 is a block diagram of an exemplary web browser suitable for practicing an embodiment of the present invention.

In continuing with the detailed description, an embodiment of the present invention is implemented by enhancing a web browser with computer software to interact with servers to retrieve and send information without user interaction. In FIG. 4, an exemplary web browser 400 may be created using an extensible markup language hypertext transfer protocol (XMLHTTP) 410, a set of components in the dynamic hypertext markup language (DHTML) 420 and 425, and a set of application program interfaces (APIs) 415 to implement an embodiment of the present invention. Other embodiments of the present invention may be implemented using different computer software such as ACTIVEX® controls, JAVASCRIPT®, applets, IFRAME, etc.

When the user desires to change an item on the screen in web page 305, XMLHTTP 410 in web browser 400 attempts to retrieve the information from server 230. XMLHTTP 410 continues these attempts without the user needing to refresh the screen associated with web page 305. XMLHTTP 410 also provides inline asynchronous data transfers which enable the user to continue working or interacting with the web browser while data is being retrieved or sent to another server. Components in DHTML (420 and 425) operate to add, remove, re-arrange, or update information in web page 305 resulting in updated web page 310 where the updated web page is the same as web page 305 with a module or information within the web page changed. Updated web page 310 is not a new or refreshed web page. FIG. 4 illustrates two sets of components in DHTML. However, it is possible to implement another embodiment of the present invention with one component of DHTML. Since different computer software may operate within DHTML to provide the functions above, the information above attempts to convey various computer software in DHTML as components. Different components of the language may perform different functions or the same functions.

Although XMLHTTP 410 may be created from a set of APIs (not shown), another set of APIs 415 may be developed as part of enhancing web browser 400 to implement an embodiment of the present invention. The set of APIs 415 may vary in function and scope, and may include such activities as interacting with other computer software in the operating environment.

Figure 5B:
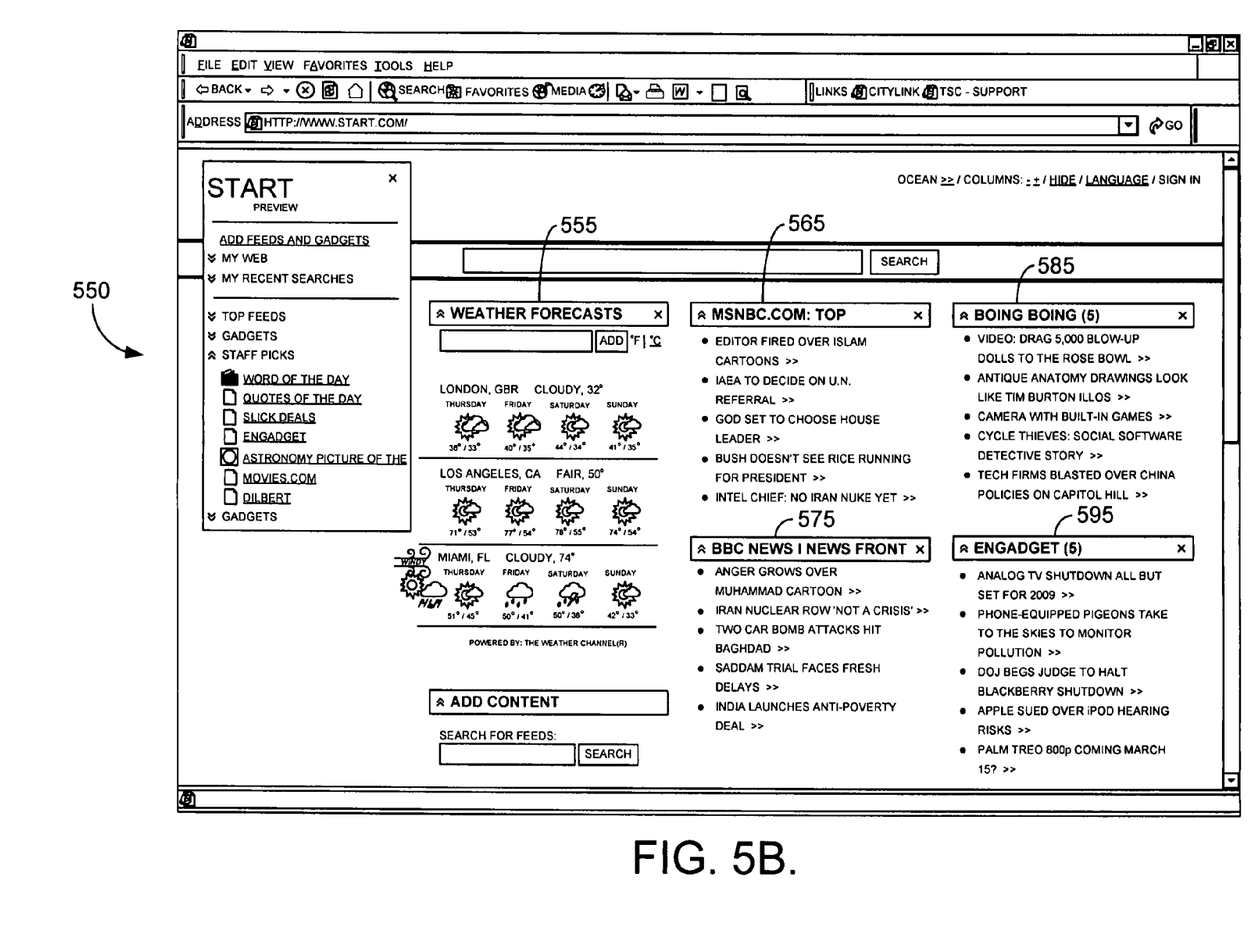

Turning now to FIGS. 5A and 5B, exemplary screenshots of web pages 500 and 550 are shown. Web page 500 illustrates an exemplary initial configuration of information shown to a user. Web page 550 illustrate an exemplary final configuration of information shown to the user. Web page 500 may be viewed as web page 305 while web page 550 may be viewed as web page 310.

Web page 500 shows a variety of information such as a weather forecasts 505 in the second column, an MSNBC-.COM 515 and a Boing Boing 525 in the third column, and an Engadget 535 and a BBC News 545 in the fourth column. Weather forecasts 505 shows the weather information for four cities in FIG. 5A. Weather forecasts 505 may be thought of as a module containing the weather information for the cities. The cities make up a list of information in the module. An item in the list may be removed as shown by a removal symbol at 501 which would result in the weather information for Redmond, Wash. being removed from the list corresponding to a removal from the display in web page 500. MSNBC-.COM 515, Boing Boing 525, Engadget 535, and BBC News 545 show news information and information for each grouped into a separate module. The corresponding bullets of information correspond to lists of information in each module. An individual item in the list may be removed as shown earlier in 501. Also, the module may be removed as shown by a removal symbol at 503. An "X" icon or other symbol may appear when a pointer from a pointing device hovers over the icon or symbol area in a screen display. The icon or symbol corresponds to removal symbols 501 or 503.

Now, a user desiring to make changes to web page 500 may add, remove, re-arrange, or update the information that is shown in FIG. 5A. To make edits, the web page does not change to another web page, the web page does not refresh, and the URL in the address bar does not change. For example, web page 500 becomes web page 550 of FIG. 5B after changes are implemented for the user. Web page 550 is web page 500 with modules or information within the web page changed. Web page 550 is not a new or refreshed web page. Weather forecasts 555 contains changed and updated information from weather forecasts 505 of FIG. 5A. As illustrated in FIG. 5B, the weather information for Atlanta, Ga.; Kansas City, Mo.; New York, N.Y.; an Redmond, Wash. in weather forecasts 505 has been deleted and replaced with the weather information for London, GBR; Los Angeles, Calif.; and Miami Fla. in weather forecasts 555. An MSNBC.COM 565 in web page 550 remains the same as MSNBC.com 515 in web page 500. BBC News 575, Boing Boing 585, and Engadget 595 in web page 550 illustrate new positions respectively for BBC News 545, Boing Boing 525, and Engadget 535 in web page 500. The implemented changes in web page 550 may be accomplished without a page refresh or a transition to an interim edit page.

It is understandable that the illustrations in FIGS. 5A and 5B are exemplary in that a different set of information may be shown or configured. For example, a stock ticker could be shown. As shown in both FIGS. 5A and 5B, additional modules may be added to the web pages showing different types of information.

Another aspect of implementing an embodiment of the present invention is that the changes made by the user may be stored for future use. For example, if the user leaves computing device 225 and re-accesses web page 310 or web page 550 at a later date, the implemented changes may be viewed in accordance with the user's preferences. This preservation of information may be implemented in various ways. One of those ways include storing cookies on computing device 225.

When the user operates a web browser that implements an embodiment of the present invention, the web browser may store one or more cookies on the user's computer such as computing device 225. The cookies provides a mechanism to associate the user's preferences with the computer so that the preferences are preserved. However, there are situations where the user may use more than one computer and would want to preserve the preferences based on the user rather than the computing device. In those instances, an embodiment may be implemented to allow the cookies to provide a username and password to the user for access to information. With the username and password, the information is associated to the user. So, no matter what computer the user operates, by providing the username and password, the user may obtain web page 310 or web page 550 with the preferential information. As the user makes subsequent changes to the web page, those changes are preserved and associated with the username and password. So, embodiments of the present invention may be implemented at least by associating information with the computing device or associating information with the user using a username and password.

Figure 6:
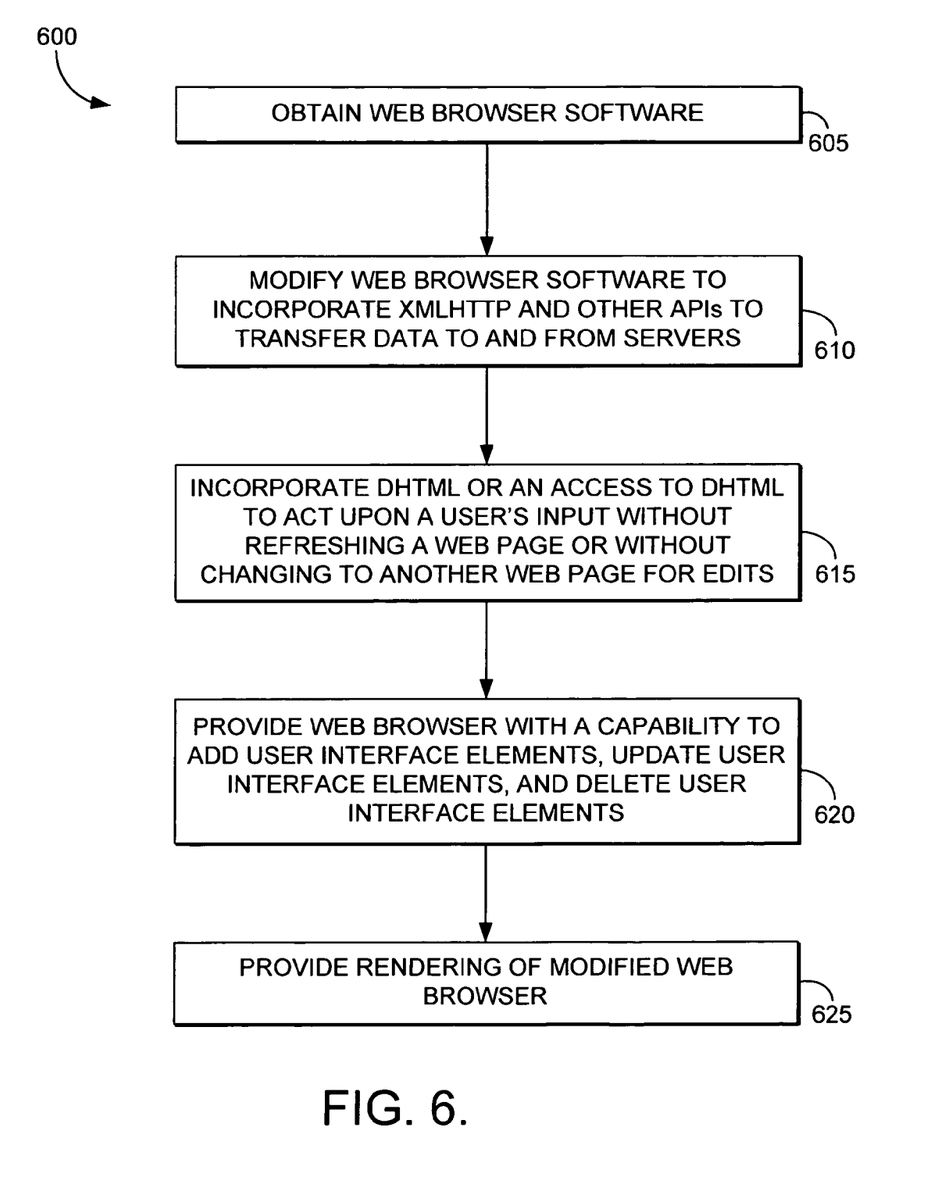
FIG. 6 is a flowchart of an exemplary process for making an embodiment of the present invention.

In FIG. 6, a process for making an embodiment of the present invention is shown in a method 600. In a step 605, the process begins with the software of an existing web browser. However, an embodiment of the present invention may be implemented during the simultaneous creation of the web browser. The web browser software is modified to incorporate XMLHTTP and other APIs as shown in FIG. 4 to transfer data to and from servers in a step 610. In a step 615, DHTML or an access to DHTML may be incorporated to act upon a user's input to change information on a web page like web page 305 or web page 500. The computer software may be created or modified such that while the user request is occurring, the user may continue operating the web browser without changing to another web page to make the edits or refreshing the web page to incorporate changes to the web page. The software changes may be incorporated into the web browser or loaded during the execution of the web browser to provide the web browser with a capability to add, update, or delete user interface elements or configurable elements as identified in a step 620. The user interface elements or configurable elements were discussed above in FIGS. 5A and 5B as modules and the list of information in the modules. In a step 625, a modified web browser is provided with a capability of operating an embodiment of the present invention. The term "modified web browser" may include a web browser that loads software for execution or an actually modified web browser.

Figure 7:
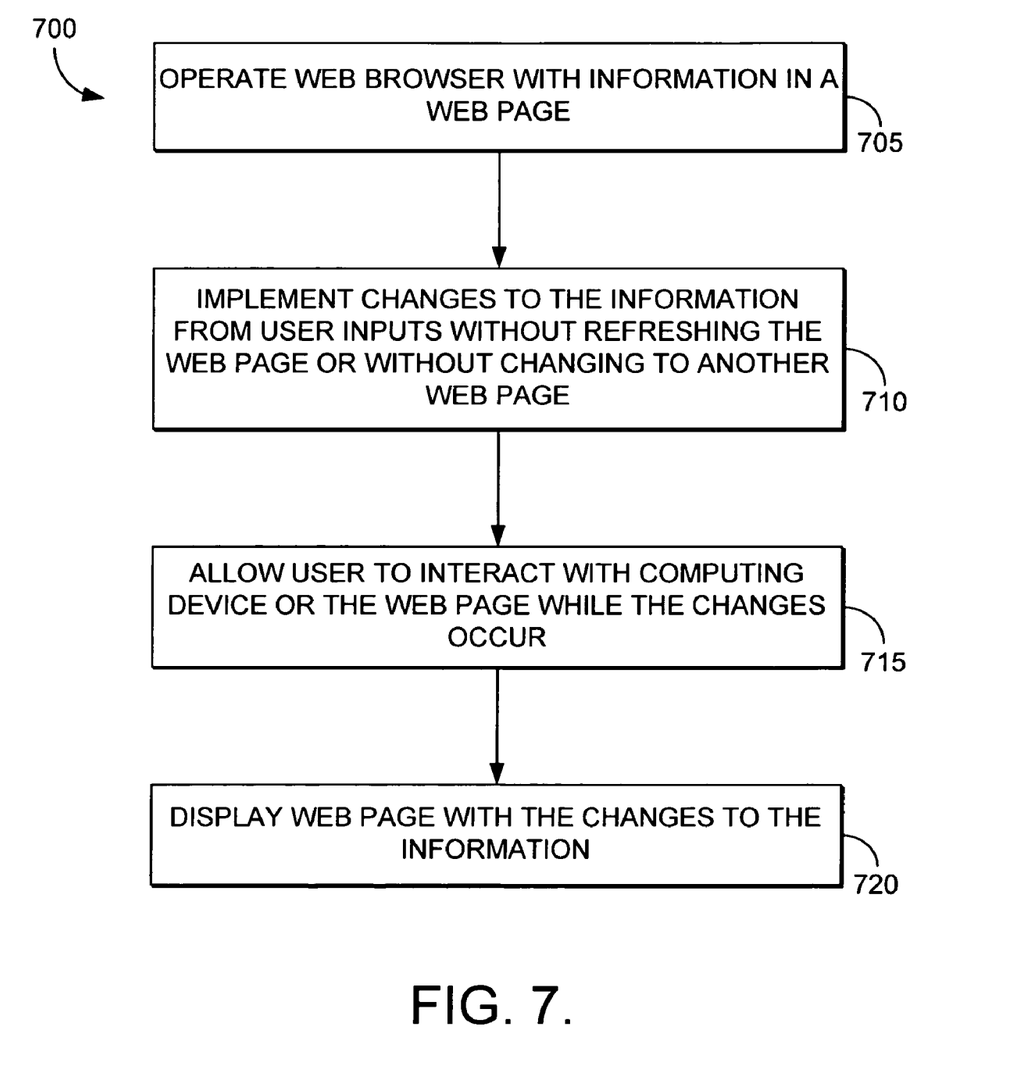
FIG. 7 is a flowchart of an exemplary process for operating an embodiment of the present invention.

Turning now to FIG. 7, a process for operating an embodiment of the present invention is shown in a method 700. Method 700 illustrates several exemplary steps of what may occur when operating a web browser that has been loaded with computer software in accordance with method 600.

In a step 705, the web browser is operated by a user at computing device 225 to show web page 305 or web page 500 with a variety of information. In a step 710, the user makes several changes to the web page and those changes are implemented such that information is sent and retrieved from server 230 without the user's knowledge. The sending, receiving, and rendering of information is accomplished using XMLHTTP 410, DHTMLs 420 and 425, and APIs 415 as exemplary sets of computer software. While these sets of actions are occurring, the user may continue to interact with computing device 225 operating the web browser and web page 305 or web page 500 as shown in a step 715. Changes to the web page are implemented in the web browser with web page 310 or web page 550 displayed with the changes to the information in a step 720. While this embodiment implements XMLHTTP 410, another embodiment may use other computer software such as IFRAME to implement the functions described above.

Figure 8:
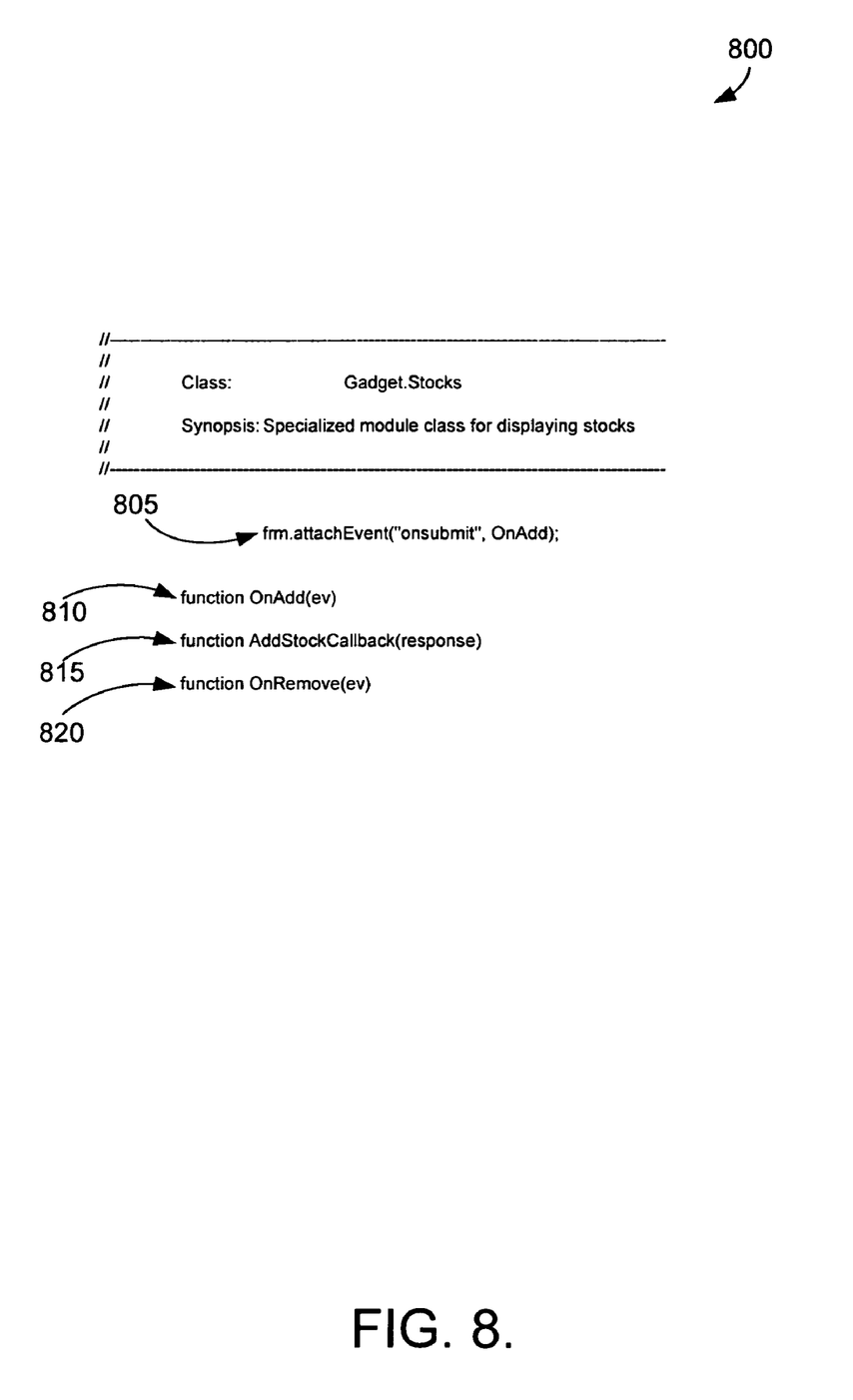
FIG. 8 is a block diagram of an exemplary computer software used in implementing an embodiment of the present invention.

In FIG. 8, a block diagram of an exemplary computer software is shown in 800. Computer program 800 is an exemplary computer software for providing a stock module implementing an embodiment of the present invention. Computer program 800 may be written using JAVASCRIPT® and DHTML. However, another programming language may be used to write computer program 800.

Only a few elements will be discussed here for clarity in describing embodiments of the present invention as discussed above. In 805, computer program 800 is executed such that an "onsubmit" event is attached to an HTML <form>element. This allows a function to be called when the user types in a stock quote and clicks the "Add" button. In 810, the function OnAdd is called when the user clicked the "Add" button. The OnAdd function makes a call to the quote service (server 230) to gather quote data, including the latest prices and other information. In 815, the function AddStockCallback, which is called during the execution of 810, is executed when the stock quote data is received. The function AddStockCallback parses XML data and adds newly returned data as an HTML element below the existing list. of stock data and persists the newly added stock ticker symbol to the user store so that it can be remembered for the next time. As discussed above, the user store may be accomplished using cookies associated with the computing device or associated to the particular user using username and password. A combination of storing information at the user's computer and at a server may occur.

In continuing with the actions that occur after clicking the "Add" button and calling the function AddStockCallback, a new row with the stock data is automatically added to the bottom of the list on the screen in the web page. The new stock is remembered in the server so that the user sees the same list when the user returns to the web page.

In 820, the OnRemove function is called when the user clicks the "X" icon or some other symbol next to each stock row. This function removes the HTML element containing the stock data from the list of stocks, and updates the server to reflect that the stock quote has been removed.

One ordinarily skilled in the art may see that various modules may be developed associated with implementing embodiments of the present invention. Computer program 800 is just one example of the approach that may be taken in implementing one type of module. Other types of modules associated with different types of information may be developed for various uses. The idea here is that various embodiments may be implemented to remove a lot of the work from the user in making changes to web pages, and allow the user to continue operating the web page without interruption while the changes are applied.

The prior discussion is for illustrative purposes to convey exemplary embodiments. The steps discussed in FIGS. 6 and 7 may be executed without regards to order. Some steps may be omitted and some steps may be executed at a different time than shown. For example, step 615 may be executed before step 610, and step 715 may be executed before step 710. The point here is to convey that the figures are merely exemplary for the embodiments of the present invention and that other embodiments may be implemented for the present invention. It will be understood that certain features and sub-combinations are of utility and may be employed without reference to other features and sub-combinations and are contemplated within the scope of the claims.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of configuring a web page without changing to another web page, comprising:
   on a computing device, displaying an instance of the web page in a web browser window, the web page displaying a set of different categories of information;
   displaying a menu of edit options over top of a portion of the instance of the web page displayed in the web browser window;
   receiving a user selection in the menu for editing the set of different categories of information being displayed in the instance of the web page;
   while continuing to display the instance of the web page, submitting an XMLHTTP request to retrieve information for satisfying the user selection in the menu;
   receiving the information from a server; while continuing to display the instance of the web page, using the information to implement one or more changes to the set of information displayed on the web page without refreshing the web page and without changing to another web page;
   preserving, using XMLHTTP, the one or more changes to the set of information for a future use in a set of cookies that is retrieved by at—a the computing device such that a retrieval of the web page from the server and the set of cookies provides the updated web page; and
   without navigating away from the web page, using DHTML to dynamically modify the set of content being displayed in the instance of the web page according to the one or more changes to the set of information.

2. The method of claim 1, wherein providing for the operation of the web browser to show the set of information comprises showing the set of information with one or more buttons to update the web page.

3. The method of claim 2, wherein providing for the operation of the web browser to show the set of information comprises showing the set of information with one or more symbols to remove one or more subsets of the set of information in the web page.

4. The method of claim 1, wherein implementing the one or more changes comprises at least one of adding more information to the set of information using XMLHTTP and DHTML, updating the set of information using XMLHTTP and DHTML, moving one or more subsets of the set of information using XMLHTTP and DHTML, or removing the one or more subsets of the set of information using XMLHTTP and DHTML.

5. A method for dynamically adding and removing elements from a web-application list module in a web server, comprising:
   providing a web page with a set of configurable elements to be viewed by a user;
   using an iFrame element to display content of the web page;
   receiving at least one of a user preference into an edit box with a button within an initial display of the web page to add a configurable element and the user preference at the initial display of the web page to remove the configurable element;

communicating with another computing device using XMLHTTP to obtain one or more data in response to the user preference to add or remove the configurable element;

at least one of adding the configurable element to the set of configurable elements in the iFrame element of the web page using DHTML and removing the configurable element from the set of configurable elements in the iFrame element of the web page using DHTML;

storing the user preference in a set of cookies at a computing device such that a retrieval of the web page and the set of cookies implements the user preference in the web page to provide an updated web page; and allowing the user to continue to interact with the updated web page uninterrupted during a receipt of the user preference, a communication with the another computing device, an addition of the configurable element, and a removal of the configurable element.

6. The method of claim 5, wherein the set of configurable elements is selected from a first group including a list of user interface elements.

7. The method of claim 6, wherein the configurable elements are selected from a second group including an add data, an edit data, an update data, and a removable data.

8. The method of claim 5, wherein communicating with the another computing device comprises transmitting the user preference to the another computing device to perform an inline asynchronous update at the another computing device to persist a change and to obtain the one or more data.

9. The method of claim 5, wherein communicating with the another computing device comprises transmitting the user preference to the another computing device to perform an inline asynchronous update at the another computing device to persist a change and to provide the one or more data.

10. The method of claim 5, further comprising storing the set of cookies at the computing device of the user to uniquely associate the set of configurable elements with the computing device to maintain a display of the set of configurable elements.

11. The method of claim 10, further comprising storing the set of cookies at a server to uniquely associate the set of configurable elements with the user using a username and a password to maintain a display of the set of configurable elements.

* * * * *

UNITED STATES PATENT AND TRADEMARK OFFICE
CERTIFICATE OF CORRECTION

| | | |
|---|---|---|
| PATENT NO. | : 7,743,334 B2 | |
| APPLICATION NO. | : 11/366723 | |
| DATED | : June 22, 2010 | |
| INVENTOR(S) | : Steven D. Rider | |

It is certified that error appears in the above-identified patent and that said Letters Patent is hereby corrected as shown below:

In column 10, line 31, in Claim 1, after "by" delete "at–a".

Signed and Sealed this
Eighth Day of February, 2011

David J. Kappos
*Director of the United States Patent and Trademark Office*